(12) United States Patent
Leung et al.

(10) Patent No.: US 8,605,584 B2
(45) Date of Patent: Dec. 10, 2013

(54) TRANSMISSION OF CONTROL INFORMATION ACROSS MULTIPLE PACKETS

(75) Inventors: Nikolai Konrad Nepomucceno Leung, Takoma Park, MD (US); Fatih Ulupinar, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/829,168

(22) Filed: Jul. 1, 2010

(65) Prior Publication Data

US 2011/0158096 A1    Jun. 30, 2011

Related U.S. Application Data

(60) Provisional application No. 61/222,590, filed on Jul. 2, 2009.

(51) Int. Cl.
*H04L 12/26* (2006.01)

(52) U.S. Cl.
USPC ......................................... 370/230

(58) Field of Classification Search
None
See application file for complete search history.

(56) References Cited

U.S. PATENT DOCUMENTS

| | | | |
|---|---|---|---|
| 4,739,510 A * | 4/1988 | Jeffers et al. ................ | 380/234 |
| 6,625,118 B1 | 9/2003 | Hadi Salim et al. | |
| 6,633,585 B1 | 10/2003 | Ghanwani et al. | |
| 2007/0195698 A1* | 8/2007 | Briscoe et al. ............... | 370/235 |

FOREIGN PATENT DOCUMENTS

| | | |
|---|---|---|
| JP | 2001168871 A | 6/2001 |
| JP | 2005064597 A | 3/2005 |

OTHER PUBLICATIONS

Ramakrishnan, K. et al., "The Addition of Explicit Congestion Notification (ECN) to IP", Network Working Group, Standards Track, RFC 3168, pp. 1-63, The Internet Society, Sep. 2001.
International Search Report and Written Opinion—PCT/US2010/040953, International Search Authority—European Patent Office—Sep. 21, 2010.
Li X, et al., "Distributed ECN-Based Congestion Control" Communications, 2009. ICC "09. IEEE International Conference on, IEEE, Piscataway, NJ, USA, Jun. 14, 2009, pp. 1-6, XP031505899 ISBN: 978-1-4244-3435-0 abstract p. 1, right-hand col.
Ramakrishnan et al., "A Proposal to add Explicit Congestion Notification (ECN) to IP; draft-kksjf-ecn-01.txt," Internet Engineering Task Force, IETF, 1998, pp. 4.
Taiwan Search Report—TW099121927—TIPO—Mar. 26, 2013.

* cited by examiner

*Primary Examiner* — Raj Jain
(74) *Attorney, Agent, or Firm* — Kam T. Tam

(57) ABSTRACT

Techniques for sending control information in the header of multiple packets are described. The techniques may allow more control information to be sent using a small number of overhead bits per packet. In one design, a first node (e.g., a network entity) may determine control information to send to a second node (e.g., a UE or another network entity). The first node may send the control information in the header of multiple packets toward the second node. In one design, the control information may include congestion information indicative of traffic congestion at the first node. The congestion information may be sent using Explicit Congestion Notification (ECN) bits in the header of IP packets. The first node may send the control information with or without coding and for all packets or a specific data flow. The first node may also send a synchronization sequence prior to the control information.

37 Claims, 8 Drawing Sheets

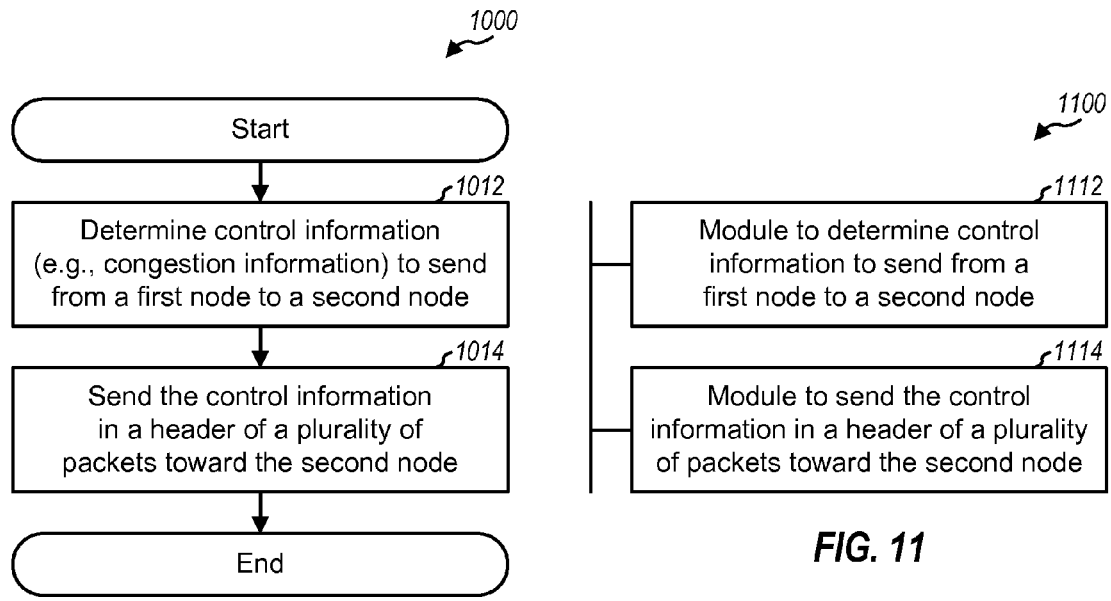
FIG. 10
FIG. 11
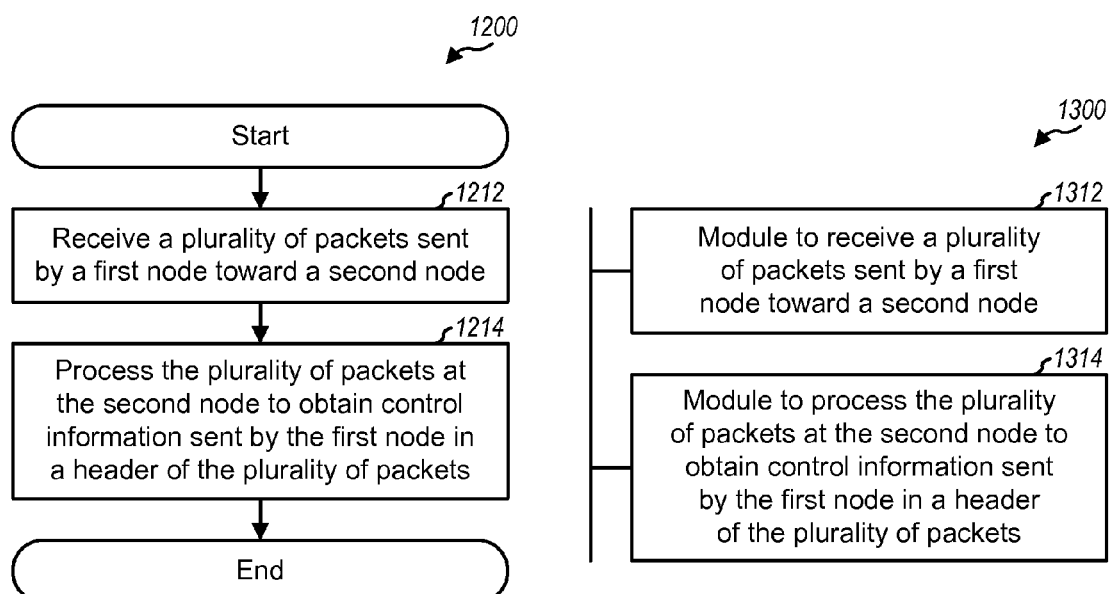
FIG. 12
FIG. 13

TRANSMISSION OF CONTROL INFORMATION ACROSS MULTIPLE PACKETS

The present application claims priority to provisional U.S. Application Ser. No. 61/222,590, entitled "CODING CONGESTION INFORMATION ACROSS MULITPLE PACKETS," filed Jul. 2, 2009, assigned to the assignee hereof and incorporated herein by reference.

BACKGROUND

I. Field

The present disclosure relates generally to communication, and more specifically to techniques for sending control information in a communication network.

II. Background

Communication networks are widely deployed to provide various communication services such as voice, video, data, messaging, broadcast, etc. A communication network may include a number of network entities that can support communication for a number of user equipments (UEs). The communication network may receive packets from a given UE and may forward the packets toward a server or a far-end UE. A packet may also be referred to as a data packet, a datagram, a transport block, etc. The communication network may also receive packets from the server or far-end UE and may forward the packets toward the UE. Each entity in a communication path from a transmitting end to a receiving end may be referred to as a node. A node may be a UE or a network entity, e.g., a base station, a router, a gateway, a server, etc.

It may be desirable to send control information from one node to another node in a communication network. A packet may be defined with a field of a suitable size to carry the control information. A node may then send the control information in the designated field of the packet. A larger field may allow more control information to be sent but may also result in more overhead per packet, which may be wasteful if control information is sent intermittently. Conversely, a smaller field may result in less overhead per packet but may also limit the amount of control information that can be sent.

There is therefore a need in the art for techniques to efficiently send control information in a communication network.

SUMMARY

Techniques for sending control information in the header of multiple packets are described herein. The techniques may allow more control information to be sent using a small number of overhead bits per packet.

In one design, a first node (e.g., a network entity such as a base station, a network controller, a router/gateway, etc.) may determine control information to send to a second node (e.g., a UE or another network entity). The first node may send the control information in the header of a plurality of packets toward the second node. In one design, the control information may comprise congestion information indicative of traffic congestion at the first node. In one design, the first node may send the congestion information using Explicit Congestion Notification (ECN) bits in the header of Internet Protocol (IP) packets.

In one design, the first node may send the control information without coding. In another design, the first node may send the control information with coding, e.g., using a block code, a fountain code, a convolutional code, etc. In one design, the first node may send the control information for all packets sent to the second node. In another design, the first node may determine control information for a specific data flow for the second node. The first node may then send the control information in the header of packets for the specific data flow. In one design, the first node may send the control information at any time. In another design, the first node may send a synchronization sequence in at least one packet prior to sending the control information in the plurality of packets. The first node may also send the control information in other manners.

Various aspects and features of the disclosure are described in further detail below.

BRIEF DESCRIPTION OF THE DRAWINGS

FIG. 10 shows a process for forwarding data in a communication network.

FIG. 11 shows an apparatus for forwarding data in a communication network.

FIG. 12 shows a process for receiving data in a communication network.

FIG. 13 shows an apparatus for receiving data in a communication network.

DETAILED DESCRIPTION

The techniques described herein may be used for various communication networks including wireless communication networks and wireline communication networks. The terms "network" and "system" are often used interchangeably. A wireless network may be a wireless wide area network (WWAN), a wireless metropolitan area network (WMAN), a wireless local area network (WLAN), etc. A wireline network may be a wide area network (WAN), a metropolitan area network (MAN), a local area network (LAN), a cable network, a computer network, etc. For clarity, certain aspects of the techniques are described below for a wireless network.

The techniques described herein may also be used to send various types of control information. For example, the techniques may be used to send congestion information indicative of traffic congestion observed by a node. The techniques may also be used to send other control information such as routing information, node capability information, etc. For clarity, certain aspects of the techniques are described below for transmission of congestion information.

Figure 1:
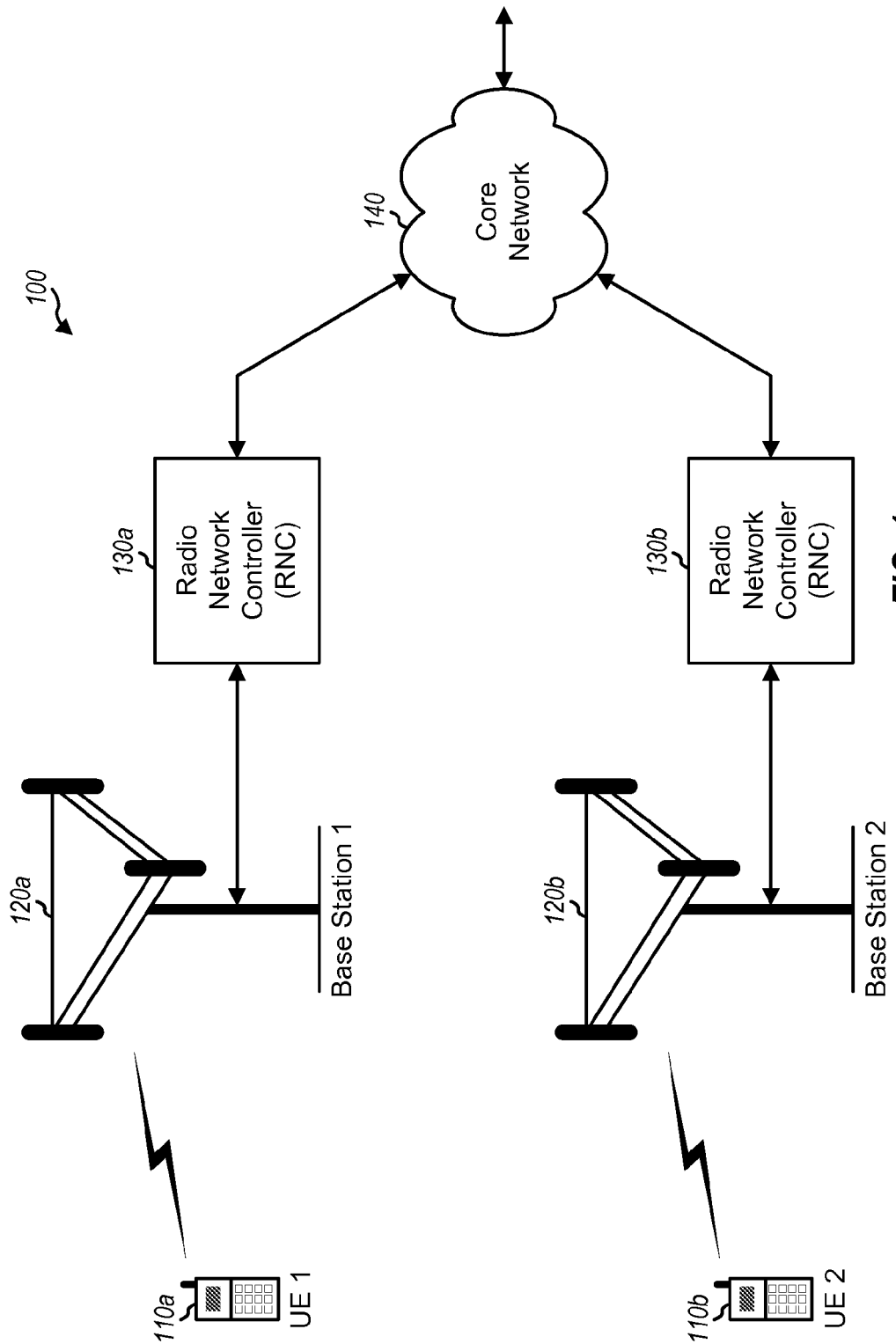
FIG. 1 shows a wireless communication network.

FIG. 1 shows a wireless communication network 100 in which the techniques described herein may be utilized. Wireless network 100 may include a number of base stations, a number of Radio Network Controllers (RNCs), and a core network 140. For simplicity, only two base stations 120*a* and 120b and two RNCs 130a and 130b are shown in FIG. 1. A base station may be an entity that communicates with the UEs and may also be referred to as a Node B, an evolved Node B (eNB), an access point, etc. Each base station may provide communication coverage for a particular geographic area and may support communication for the UEs located within the coverage area.

An RNC may also be referred to as a Mobile Switching Center (MSC), a Serving Gateway (SGW), etc. Each RNC may couple to a set of base stations and may provide coordination and control for the base stations. Each RNC may route packets between its base stations and core network 140. Core network 140 may include network entities that may support various communication services for the UEs. Core network 140 may also include routers/gateways for routing packets to/from the UEs.

Wireless network 100 may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

UEs may be dispersed throughout wireless network 100, and each UE may be stationary or mobile. For simplicity, only two UEs 110a and 110b are shown in FIG. 1. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with a base station via the downlink and uplink. The downlink (or forward link) refers to the communication link from the base station to the UE, and the uplink (or reverse link) refers to the communication link from the UE to the base station.

In the example shown in FIG. 1, UE 110a may have a call with UE 110b. UE 110a may send packets via a first communication path to UE 110b. The first communication path may include base station 120a, RNC 130a, core network 140, RNC 130b, and base station 120b. Correspondingly, UE 110b may send packets via a second communication path to UE 110a. The second communication path may include base station 120b, RNC 130b, core network 140, RNC 130a, and base station 120a.

In general, a transmitting node may send packets to a receiving node via a communication path comprising any number of intermediate nodes. Each intermediate node may have any capacity (e.g., for storing and processing packets) and may observe any load at any given moment. Each intermediate node should process incoming packets and send outgoing packets to the proper recipient nodes within the permitted delay. An intermediate node may be congested, and the load at the node may exceed the capacity of the node. For example, incoming packets may arrive faster than the intermediate node can store and process. When congestion occurs, the intermediate node may discard packets that cannot be processed and forwarded.

It may be desirable for intermediate nodes along a communication path to communicate their state of congestion. A receiving node may receive congestion information from the intermediate nodes and may use this information to (i) change its data rate and/or (ii) change the data rate of its peer transmitting node towards the receiving node. This rate adaptation may be able to address congestion in any intermediate node.

Figure 2:
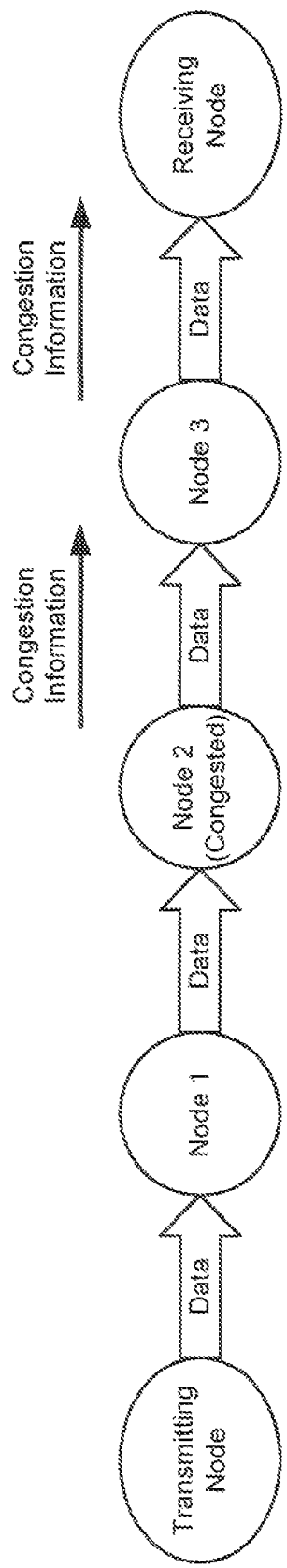
FIG. 2 shows transmission of congestion information.

FIG. 2 illustrates transmission of congestion information. A transmitting node may send packets via a communication path to a receiving node. In the example shown in FIG. 2, the communication path may include three intermediate nodes 1, 2 and 3. Each intermediate node may receive packets from an upstream node and may forward the packets to a downstream node. Node 2 may observe congestion and may send congestion information toward the receiving node. Node 2 may send the congestion information to downstream node 3, which may forward the congestion information to the receiving node. The receiving node may recognize that at least one intermediate node in the communication path is congested based on the congestion information. The receiving node may then reduce the data rate of the transmitting node in order to alleviate congestion in the intermediate nodes.

In general, a node may send congestion information using out-of-band signaling or in-band signaling. The node may send congestion information (i) separately from packets using out-of-band signaling or (ii) in the packets using in-band signaling. It may be more efficient to send the congestion information in the packets sent toward the receiving node. This may avoid the need for extra signaling and may also ensure that all of the nodes that transport the packets from the transmitting node to the receiving node can provide congestion information if needed.

One method of sending congestion information with in-band signaling is to use the two ECN bits in the header of an IP packet, as described in Request for Comments (RFC) 3168, entitled "The Addition of Explicit Congestion Notification (ECN) to IP," from Internet Engineering Task Force (IEFT), which is publicly available. The 2-bit ECN may be set to one of four possible values, with a value of '11' being used to indicate congestion. A node may set the ECN bits of the header of an IP packet to '11' if the node detects congestion. A receiving node may receive the IP packet with the ECN bits set to '11' and may recognize that at least one intermediate node in the communication path from the transmitting node to the receiving node has observed congestion. The receiving node may then take appropriate corrective actions.

The method described above uses very little overhead (two bits) per IP packet to convey congestion information. However, a major limitation of this method is that only a small amount of information can be communicated. In particular, a given intermediate node can only convey "congestion experienced" or "no-congestion experienced" using the ECN bits. More bits in the IP packet header may be used to send congestion information. This would allow for communication of more accurate congestion information. However, more overhead per IP packet would be incurred for sending congestion information. Furthermore, the use of additional bits to convey congestion information may not be backward compatible with communication networks supporting the 2-bit ECN in the conventional manner.

In an aspect, control information may be sent in multiple packets, which may allow more control information to be sent using a small number of overhead bits per packet. In one design, congestion information may be sent in multiple packets using the ECN bits in the header of each packet. This may allow more granular congestion information to be sent without increasing IP packet overhead.

Figure 3:
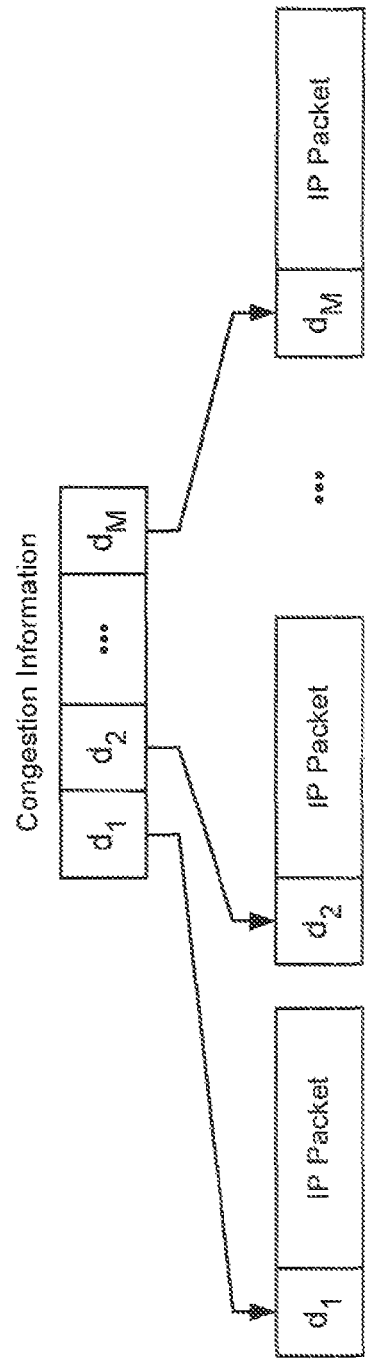
FIG. 3 shows transmission of congestion information across multiple packets.

FIG. 3 shows a design of sending congestion information in multiple IP packets. An intermediate node may observe congestion and may have congestion information to send toward a receiving node. The intermediate node may partition the congestion information into M parts $d_1$ through $d_M$, where M may be any value greater than one. In general, each part may include any number of bits of the congestion information. In one design, each part may include two bits of the congestion information and may be sent using the two ECN bits. In another design, each part may include one bit of the congestion information and may be sent using the two ECN bits. For example, an information bit of '0' may be sent with ECN bits of '00', and an information bit of '1' may be sent with ECN bits of '11'. In any case, the intermediate node may send the M parts of the congestion information in the ECN of the header of M IP packets, one part of the congestion information in each IP packet.

In general, any number of bits of congestion information may be sent in any number of IP packets. More granularity for congestion information may be achieved by sending the congestion information in more IP packets. This may allow an intermediate node to send congestion information based on long-term statistical measurements and trends rather than a short-term decision of congested or not congested. In one design, the intermediate node may send congestion information comprising one or more of the following:

Maximum data rate—maximum data rate supported by the intermediate node,
Buffer space—average amount of data that can be queued by the intermediate node,
Queuing delay—average queuing delay through the intermediate node, and
Other information indicative of the congestion state of the intermediate node.

In one design, a set of data rates may be supported, and each data rate may be assigned a unique index. Congestion information may comprise an index of a maximum data rate supported by the intermediate node. More data rates may be supported with more bits for the congestion information. The congestion information may also convey other information.

The longer-term congestion state of the intermediate node may not change very often. Congestion information regarding the longer-term congestion state may be sent in multiple IP packets if the rate of IP packets being sent is sufficiently greater than the rate of change of the congestion information.

In one design, congestion information may be sent for all IP packets forwarded to the receiving node. In another design, congestion information may be sent for a specific data flow for the receiving node. A data flow may also be referred to as an IP flow, a traffic flow, a flow, etc. The receiving node may have a number of data flows for one or more applications. Congestion information may be sent for a specific data flow for a specific application. This may allow the receiving node to control the data rate of the specific data flow based on the congestion information for that data flow.

Figure 4:
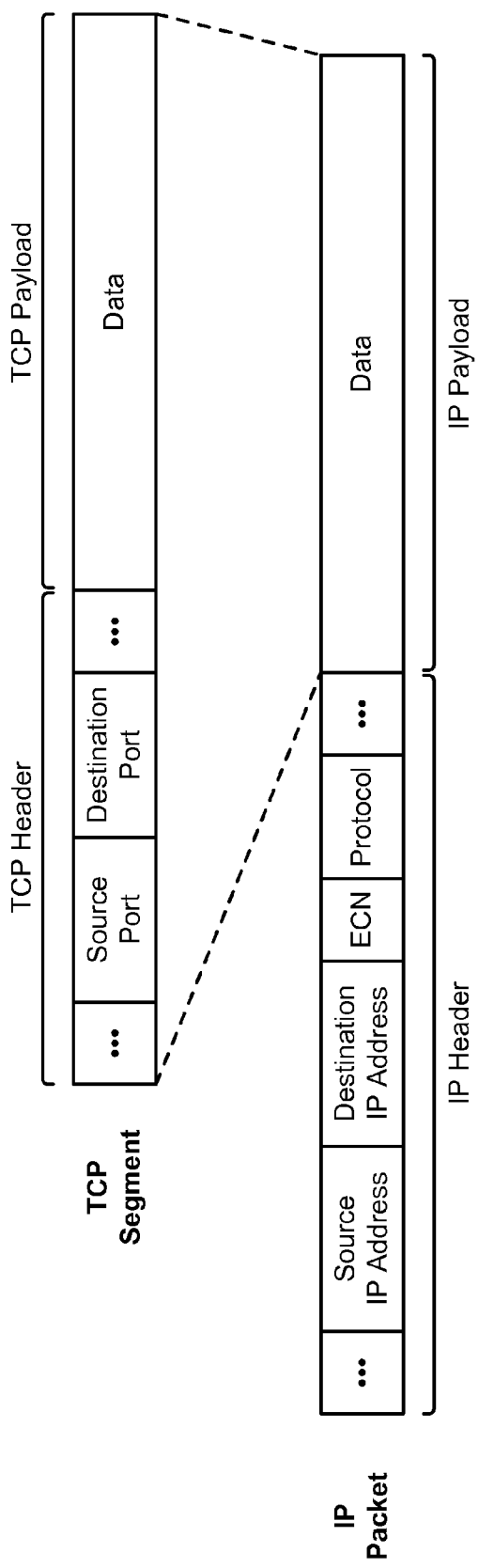
FIG. 4 shows encapsulation of data units for transport and network layers.

FIG. 4 shows the formats and encapsulation of data units for a transport layer and a network layer. Applications at higher layer may send data using various protocols such as Real-time Transport Protocol (RTP), etc. RTP is commonly used for voice, video, teleconference, and other delay sensitive applications. Application data may be provided to the transport layer and sent using various protocols such as Transmission Control Protocol (TCP), User Datagram Protocol (UDP), etc.

TCP can provide reliable, in-order delivery of data and may be used for applications requiring reliable data delivery such as downloading, Web browsing, etc. For TCP, data is sent as TCP segments, with each TCP segment including a TCP header and a TCP payload. The TCP header includes (i) a source port for a transmitting node sending the data, (ii) a destination port for a receiving node to which the data is sent, and (iii) other fields not shown in FIG. 4 for simplicity. A port may be a logical channel associated with the data in the payload.

UDP can provide unreliable delivery of data (albeit with less overhead) and may be used for delay-sensitive applications in which dropping packets may be preferred over waiting for delayed packets. For UDP, data is sent as UDP datagrams, with each UDP datagram including a UDP header and a UDP payload. The UDP header includes a source port, a destination port, and other fields.

Transport layer data may be provided to the network layer and sent using IP. For IP, data is sent as IP packets (or datagrams), with each IP packet including an IP header and an IP payload. The IP header includes (i) a source IP address for a source node sending the IP packet, (ii) a destination IP address for a destination node to which the IP packet is sent, (iii) a protocol field indicating the protocol (e.g., TCP or UDP) used for the data sent in the IP payload, (iv) the ECN bits, and (v) other fields not shown in FIG. 4 for simplicity. The IP payload may carry a TCP segment, a UDP datagram, or some other data.

A data flow may be uniquely identified by a 5-tuple combination of source IP address, destination IP address, source port, destination port, and protocol. An intermediate node may identify packets belonging to a particular data flow by examining the five fields in the IP header and the TCP/UDP header of each packet. The intermediate node may determine congestion information for the data flow and may send this information in packets for the data flow.

Figure 5:
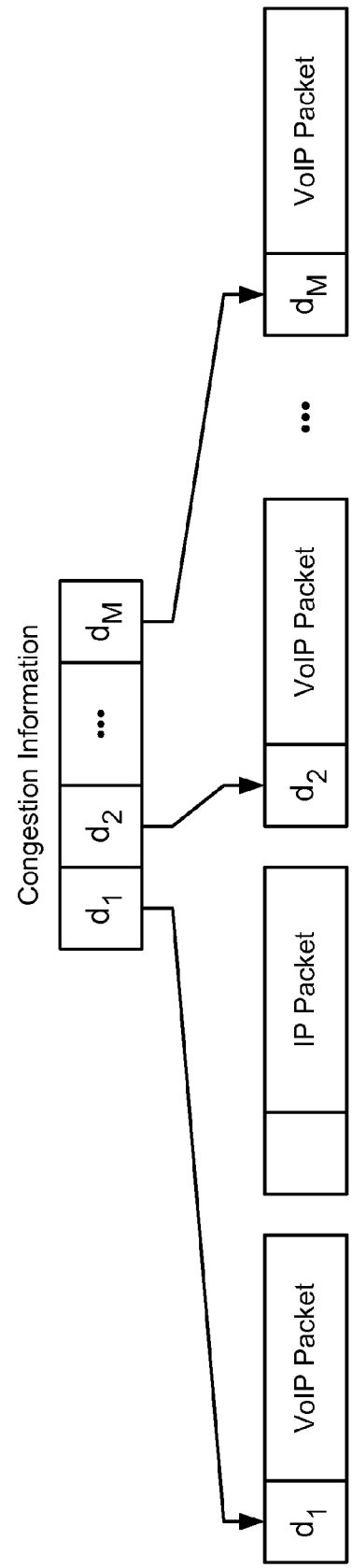
FIG. 5 shows transmission of congestion information for a data flow.

FIG. 5 shows a design of sending congestion information for a data flow. An intermediate node may have congestion information for the data flow, which may be for a real-time service such as Voice-over-IP (VoIP). The intermediate node may partition the congestion information into M parts $d_1$ through $d_M$, where M is greater than one. The intermediate node may send the M parts of the congestion information in the ECN of the header of M IP packets for the data flow, one part of the congestion information in each IP packet. The intermediate node may avoid sending the congestion information in IP packets for other data flows, even if these IP packets are sent to the same receiving node.

In general, an intermediate node may send congestion information for any number of data flows. The intermediate node may send congestion information indicative of the congestion state of a specific data flow, or a group of data flows (e.g., for a particular application), or all data flows for a receiving node. For example, the intermediate node may send congestion information indicative of congestion in IP packets for a VoIP flow, congestion information indicative of congestion in IP packets for a TCP flow, etc.

In one design that is described above, congestion information may be sent without any coding in the header of multiple IP packets. A receiving node may receive all IP packets carrying the congestion information and may recover the congestion information from these IP packets.

In another design, congestion information may be encoded with a forward error correcting (FEC) code prior to transmission in the header of multiple IP packets. This design may allow a receiving node to recover the congestion information even if one or more of the IP packets are dropped, or corrupted, or delivered out of order.

Figure 6:
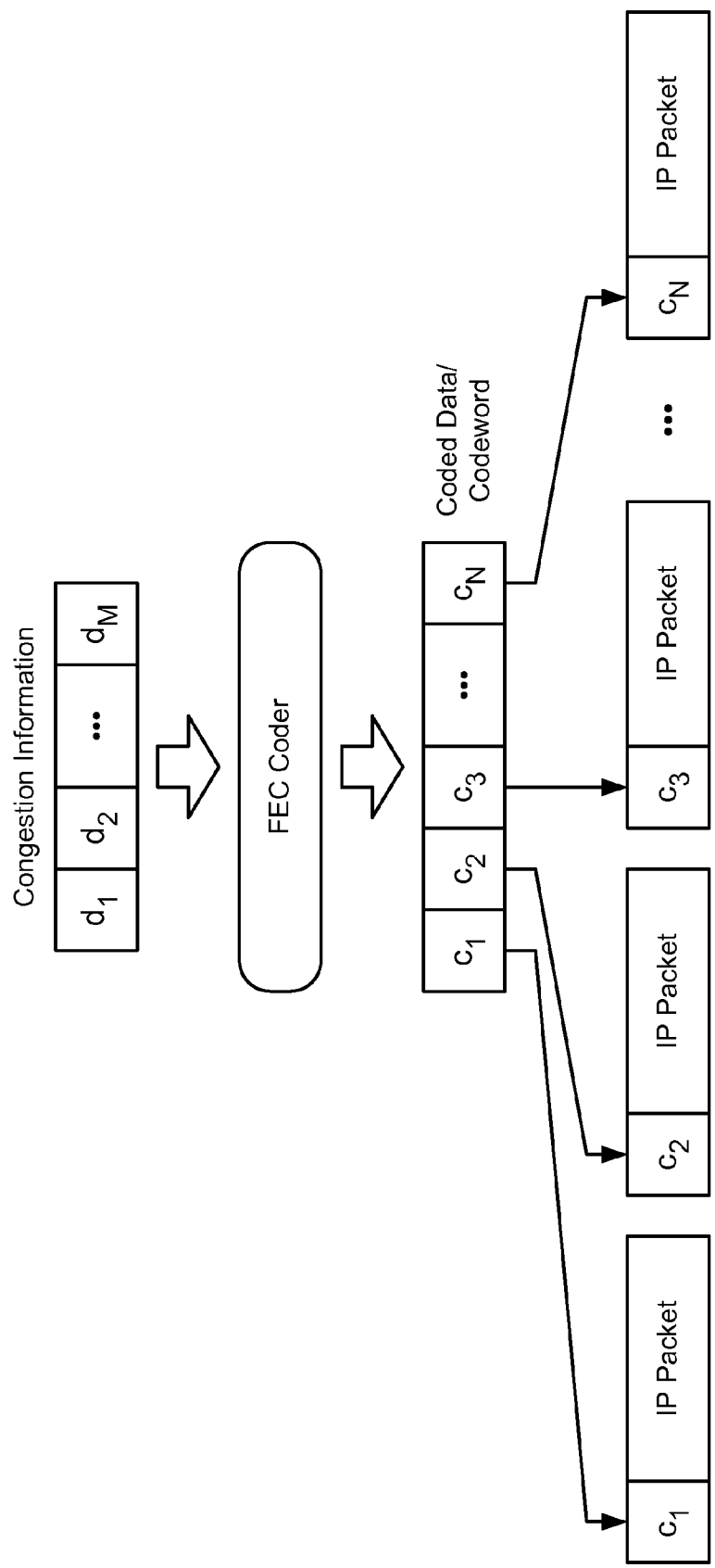
FIG. 6 shows transmission of congestion information with coding.

FIG. 6 shows a design of sending congestion information with coding in multiple IP packets. An intermediate node may observe congestion and may have congestion information to send toward a receiving node. The intermediate node may encode the congestion information with an FEC encoder to generate coded data, which may also be referred to as a codeword. The intermediate node may partition the coded data into N parts $c_1$ through $c_N$, where N may be greater than one. The intermediate node may send the N parts of the coded data in the ECN of the header of N IP packets, one part of the coded data in each IP packet.

In general, congestion information may be encoded based on various FEC codes including block codes, fountain codes, convolutional codes, Turbo codes, etc. A block code may receive a block of information of a first size, encode the information, and provide a block of coded data of a second size. The first and second sizes may be fixed and may be selected based on the amount of information to send and the desired amount of redundancy or error correcting ability. Various types of block code may be used for encoding congestion information and may include Reed-Solomon codes, Reed-Mueller codes, Hamming codes, etc. A fountain code (which may also be referred to as a rateless code) may receive a block of information, encode the information, and provide a fixed or a variable amount of coded data. A variable rate fountain code may be used to allow an intermediate node to send progressively more coded data until the congestion information is correctly received by a receiving node. The receiving node may then send an acknowledgement (ACK) to indicate that it has properly decoded the congestion information. The receiving node may send the ACK to the intermediate node via the header of IP packets sent toward the intermediate node.

A receiving node may receive a sequence of IP packets, extract coded data from the header of the IP packets, concatenate the coded data, and perform FEC decoding to recover congestion information sent by an intermediate node. The FEC code used to send the congestion information may enable the receiving node to correct errors and erasures in the coded data. Erasures may result from missing coded data, which may be due to dropped IP packets. Errors may result from (i) corrupted coded data due to noisy channel and/or (ii) out-of-order coded data due to IP packets received out of sequence. The error and erasure correcting capability of the FEC code may determine the amount of errors and erasures that can be corrected by the receiving node.

In one design, an FEC code with sufficient error and erasure correcting capability may be selected for use to encode congestion information. In another design, an FEC code with capability to correct a certain amount of errors and erasures may be designed and used to encode congestion information. This "custom" FEC code may also be designed to take care of erasures and re-ordering due to out-of-sequence IP packets. For example, the custom FEC code may map a given word for congestion information to a set of codewords for different possible orders in which IP packets carrying the congestion information might be received.

In one design, a receiving node may detect for erasures due to dropped IP packets and may re-arrange coded data as necessary based on detected erasures. The receiving node may also detect for out-of-order coded data due to out-of-sequence IP packets and may re-order the coded data as necessary. The receiving node may detect for erasures and out-of-order coded data by examining relevant information in the payload of IP packets. For example, the IP packets may carry real-time multimedia data for an RTP/UDP data flow, and RTP sequence numbers for consecutive packets should be increasing. A missing RTP sequence number or out-of-order RTP sequence numbers may be used to identify dropped or out-of-order coded data. The receiving node may insert erasures for each IP packet corresponding to a missing RTP sequence number and may re-order coded data for IP packets corresponding to out-of-order RTP sequence numbers. The receiving node may then perform FEC decoding on the re-arranged code data.

In general, a receiving node may detect for erasures and out-of-order coded data and may re-arrange coded data based on the sequence number for any protocol above IP. The erasure insertion and re-ordering by the receiving node may cause errors if an intermediate node receives dropped and/or re-ordered IP packets from an upstream node and sends congestion information in these IP packets. The receiving node may thus perform FEC decoding on (i) the received coded data without any erasure insertion or re-ordering and (ii) the re-arranged code data with erasure insertion and/or re-ordering.

In one design, an intermediate node may send a synchronization sequence prior to congestion information. The synchronization sequence may enable a receiving node to detect the start of the congestion information, which may improve decoding performance.

Figure 7:
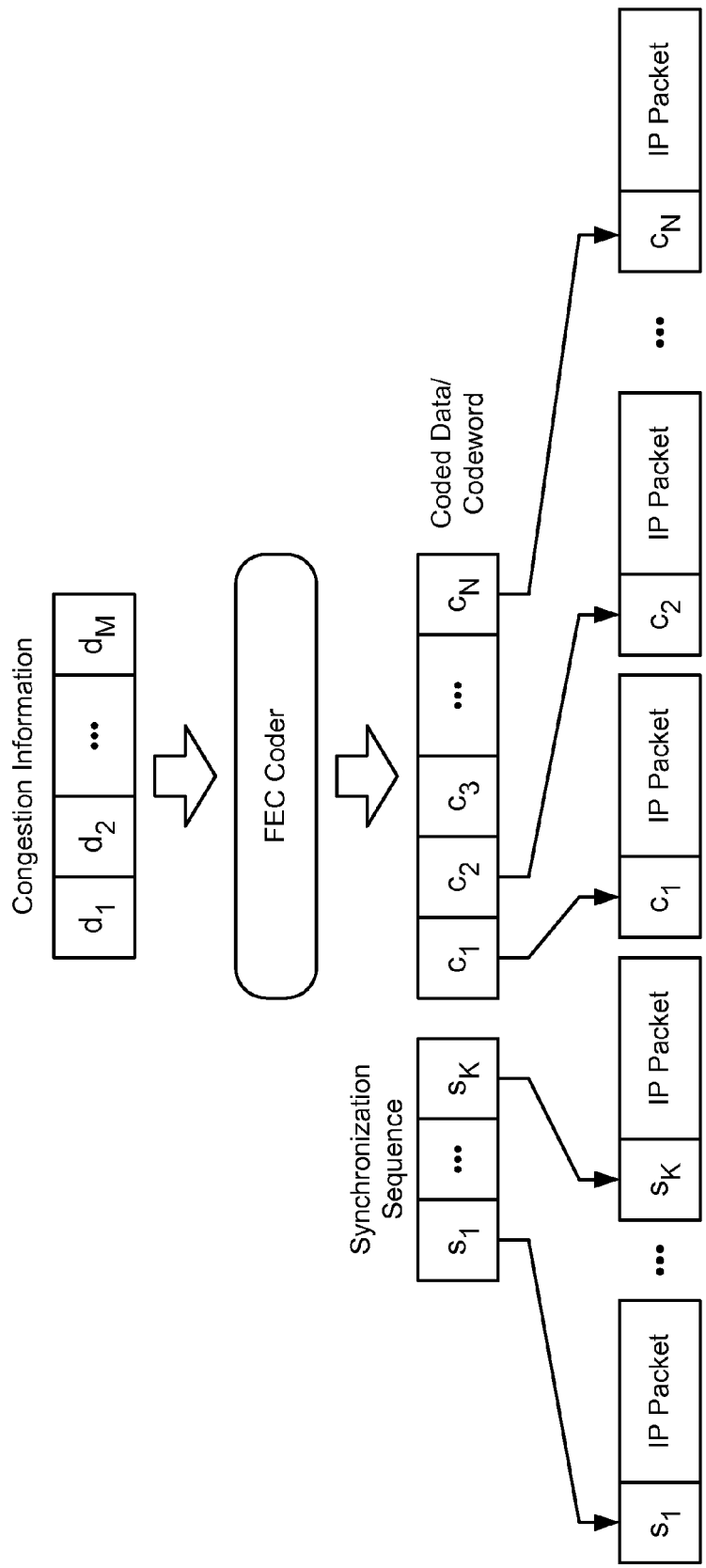
FIG. 7 shows transmission of a synchronization sequence before congestion information.

FIG. 7 shows a design of sending a synchronization sequence before congestion information. An intermediate node may have congestion information to send toward a receiving node. The intermediate node may encode the congestion information with an FEC encoder to generate coded data and may partition the coded data into N parts $c_1$ through $c_N$, where N may be greater than one. The intermediate node may partition a synchronization sequence into K parts $s_1$ through $s_K$, where K may be one or greater. The intermediate node may send the K parts of the synchronization sequence in the ECN of the header of K IP packets, one part of the synchronization sequence in each IP packet. The intermediate node may then send the N parts of the coded data in the ECN of the header of N IP packets, one part of the coded data in each IP packet.

The receiving node may receive IP packets and may detect for the synchronization sequence in the received IP packets. Upon detecting the synchronization sequence, the receiving node may obtain coded data from subsequent IP packets and may decode the coded data to obtain the congestion information sent to the receiving node. The use of the synchronization sequence may improve the probability of the receiving node correctly decoding a codeword sent for the congestion information.

In general, the synchronization sequence may comprise any suitable sequence of bits. The synchronization sequence should not be a valid codeword for congestion information, so that this codeword will not be erroneously detected as the synchronization sequence. The synchronization sequence may have any suitable length. A shorter synchronization sequence may reduce overhead and may be preferred if congestion information is sent more frequently. A longer synchronization sequence may provide better detection reliability and may be preferred if congestion information is sent less frequently. The length of the synchronization sequence may or may not match the length of a codeword for congestion information.

Figure 8:
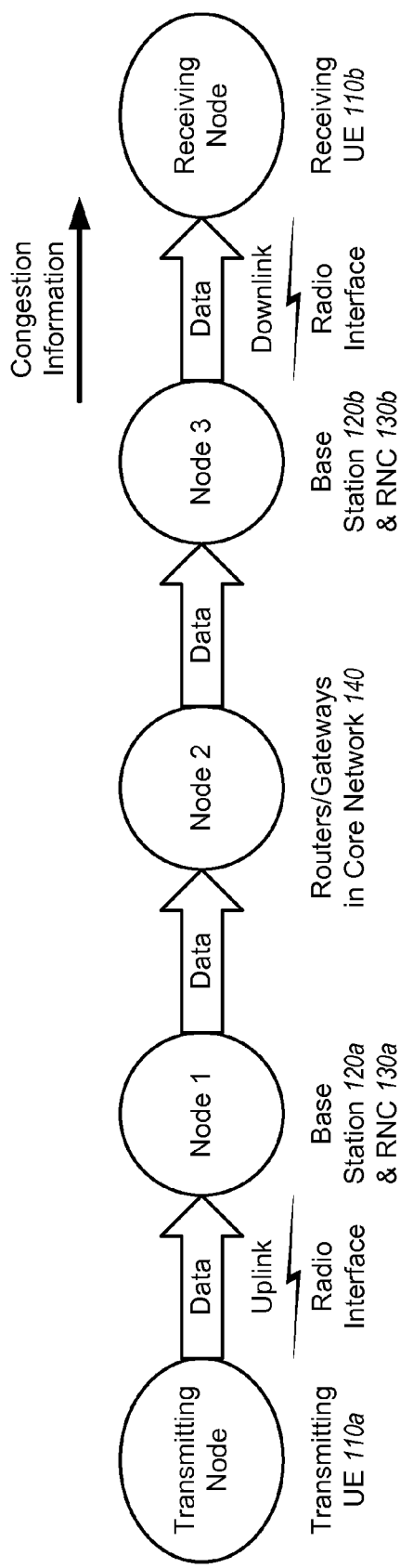
FIGS. 8 and 9 show exemplary transmissions of congestion information in a wireless network.

FIG. 8 shows exemplary transmission of data and congestion information in wireless network 100 in FIG. 1. UE 110a may be a transmitting node/UE, and UE 110b may be a receiving node/UE. The communication path from UE 110a to UE 110b may include node 1 corresponding to base station 120a and RNC 130b, node 2 corresponding to router/gateways in core network 140, and node 3 corresponding to base station 120b and RNC 130b.

In the example shown in FIG. 8, node 3 may have congestion information to send to the receiving UE. For a wireless network, the congestion observed by node 3 may be due to limited bandwidth available to send data on the downlink to the receiving UE. Node 3 may then send congestion information comprising a maximum supported data rate to the receiving UE. Node 3 may receive IP packets from upstream node 2 (in the core network) and may send the congestion information in multiple IP packets to the receiving UE.

Node 3 may have different congestion states (e.g., different maximum rates) for the downlink and uplink for the receiving UE. In one design, the congestion information sent by node 3 may include a bit to indicate whether the congestion information (e.g., the maximum rate) is applicable for the downlink or uplink. In one design, node 3 may send congestion information separately for the downlink and uplink, e.g., one codeword for a maximum data rate for the downlink, and another codeword for a maximum data rate for the uplink. In another design, node 3 may send a single codeword comprising congestion information for both the downlink and uplink (e.g., one maximum data rate for each link). Node 3 may also send congestion information to the receiving UE in other manners.

Figure 9:
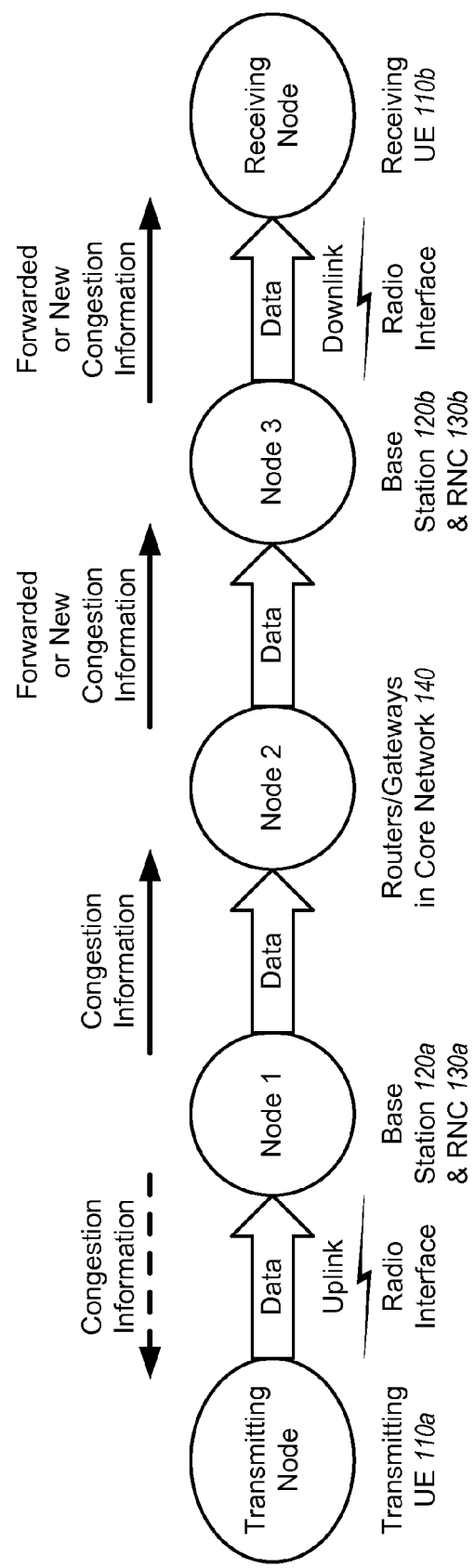

FIG. 9 shows another exemplary transmission of data and congestion information in wireless network 100 in FIG. 1. In the example shown in FIG. 9, node 1 may have congestion information to send to the receiving UE and may send the congestion information (e.g., a maximum data rate) in IP packets toward the receiving UE. Node 2 may be aware of node 1 sending congestion information across IP packets and may detect for congestion information from upstream node 1. Node 2 may obtain the maximum data rate supported by node 1 for the receiving UE. If node 2 can support this maximum data rate, then node 2 may simply forward the congestion information toward the receiving UE. However, if node 2 can only support a lower data rate for the receiving UE, then node 2 may discard the congestion information received from upstream node 1 and may send new congestion information comprising a maximum data rate that node 2 can support. Similarly, node 3 may detect for congestion information from upstream node 2 and obtain the maximum data rate supported by both nodes 1 and 2. If node 3 can support this maximum data rate, then node 3 may simply forward the congestion information toward the receiving UE. However, if node 3 can only support a lower data rate, then node 3 may discard the congestion information received from node 2 and may send new congestion information comprising a maximum data rate that node 3 can support.

In general, each intermediate node in the communication path from the transmitting UE to the receiving UE may either (i) forward congestion information received from an upstream node if the intermediate node can support a maximum data rate indicated by the received congestion information or (ii) send new congestion information comprising a maximum data rate supported by the intermediate node. As a result of this processing by each intermediate node in the communication path, the maximum data rate received by each node (including the receiving node) is the lowest/minimum of the maximum data rates supported by all upstream nodes.

An intermediate node may detect for congestion information from an upstream node without queuing received IP packets. The intermediate node may forward any congestion information received from the upstream node. If the intermediate node decides to send new congestion information, then it may send this information in the next sequence of IP packets to send toward the receiving node.

An intermediate node in a communication path may be unaware of congestion information being sent in multiple IP packets. The intermediate node may support the method in which either congestion or no congestion is conveyed using the ECN bits in the header of a single IP packet. The intermediate node may change the ECN bits of some IP packets based on its congestion state. These changes by the intermediate node may result in errors in some of the coded data received by a downstream node. The downstream node may recover the congestion information, even in the presence of errors, based on an FEC code used to send the congestion information.

A receiving UE may receive congestion information in multiple IP packets and may determine the maximum data rate supported by all intermediate nodes in a communication path. The receiving UE may control an encoder at a transmitting UE based on the maximum data rate obtained from the congestion information. The receiving UE may control the encoder at the transmitting UE using RTP in-band codec mode requests, RTP Control Protocol (RTCP) messages, and/or other mechanisms or protocols. Alternatively or additionally, node 1 closest to the transmitting node may send congestion information directly to the transmitting UE to control the encoder at the transmitting UE based on the maximum data rate supported by node 1 for the transmitting UE on the uplink, as shown by the dashed arrow in FIG. 9.

Various designs for sending congestion information in multiple packets have been described. These designs may be used to send congestion information for all packets sent to a receiving node, or for a specific data flow, or for a group of data flows, etc. For example, congestion information for all packets may be sent with FEC coding, as shown in FIG. 6. Congestion information for a specific data flow may also be sent with FEC coding across packets for this data flow. Congestion information for all packets may be sent with a synchronization sequence, as shown in FIG. 7. Congestion information for a specific data flow may also be sent with a synchronization sequence across packets for this data flow. Congestion information for all packets may be forwarded and/or replaced by each node in a communication path, as shown in FIG. 9. Congestion information for a specific data flow may also be forwarded and/or replaced in packets for this data flow by each node in a communication path. Other features of sending congestion information in multiple packets may also be applied for a specific data flow.

For clarity, transmission of congestion information in multiple packets has been described above. In general, the techniques may be used to send any control information from one node toward another node in a communication path. For example, the techniques may be used to send routing information, node capability information, etc.

FIG. 10 shows a design of a process 1000 for forwarding data from a first node toward a second node in a communication network. The first node may be an intermediate node in the communication path. The second node may be a receiving node or another intermediate node. The first node may correspond to a network entity such as a base station, a router/gateway, a server, etc. The second node may correspond to a UE or another network entity. Process 1000 may be performed by the first node. The first node may receive packets from an upstream node for forwarding toward the second node. The first node may determine control information to send to the second node (block 1012). The first node may send the control information in a header of a plurality of packets toward the second node (block 1114).

In one design, the control information may comprise congestion information indicative of traffic congestion at the first node. In one design, the congestion information may comprise a maximum data rate supported by the first node, e.g., for the second node. In other designs, the congestion information may comprise other information indicative of traffic congestion at the first node. In one design, the first node may send the congestion information using the ECN bits in the header of IP packets. The first node may also send the congestion information using other bits or fields of the header.

In one design, the congestion information to send to the second node may correspond to the lowest maximum data rate supported by all nodes in a communication path to the second node. The first node may receive congestion information from a third node that is upstream to the first node. The first node may provide the received congestion information as the congestion information to send to the second node if the maximum data rate supported by the third node for the first node is greater than or equal to the maximum data rate supported by the first node for the second node. The first node may provide new congestion information as the congestion information to send to the second node if the maximum data rate supported by the first node for the second node is less than the maximum data rate supported by the third node for the first node. The new congestion information may comprise the maximum data rate supported by the first node for the second node.

In one design, the first node may send the control information without coding. The first node may partition the control information into a plurality of parts. The first node may then send each of the plurality of parts of the control information in the header of one of the plurality of packets, e.g., as shown in FIG. 3.

In another design, the first node may send the control information with coding. The first node may encode the control information (e.g., based on a block code, a fountain code, a convolutional code, a Turbo code, some other code, or a combination thereof) to obtain coded data. The first node may partition the coded data into a plurality of parts. The first node may then send each of the plurality of parts of the coded data in the header of one of the plurality of packets, e.g., as shown in FIG. 6.

In one design, the first node may send the control information for all packets being sent to the second node. In another design, the first node may determine control information for a specific data flow for the second node. The first node may then send the control information in the header of packets for the data flow.

In one design, the first node may send the control information to the second node at any time. In another design, the first node may send a synchronization sequence in at least one packet prior to sending the control information in the plurality of packets, e.g., as shown in FIG. 7.

In one design, the first node may comprise a network entity (e.g., a base station) and the second node may comprise a UE in a wireless network. In another design, the first node may comprise a router/gateway or a server, and the second node may comprise a UE in a wireline network. In general, the first and second nodes may be any two network entities in a wireless or wireline network. The first node may send packets either directly to the second node or indirectly to the second node via one or more other nodes.

FIG. 11 shows a design of an apparatus 1100 for forwarding data in a communication network. Apparatus 1100 includes a module 1112 to determine control information to send from a first node to a second node, and a module 1114 to send the control information in a header of a plurality of packets toward the second node.

FIG. 12 shows a design of a process 1200 for receiving data sent by a first node to a second node in a communication network. The first and second nodes may be as described above for FIG. 10. Process 1200 may be performed by the second node. The second node may receive a plurality of packets sent by the first node toward the second node (block 1212). The second node may process the plurality of packets to obtain control information sent by the first node in a header of the plurality of packets (block 1214). In one design, the control information may comprise congestion information indicative of traffic congestion at the first node. In response to the congestion information, the second node may send a message to reduce a data rate of a third node sending data to the second node.

In one design, the control information may be sent by the first node without coding. The second node may obtain a portion of the control information from the header of each of the plurality of packets. In another design, the control information may be sent by the first node with coding. The second node may obtain a portion of coded data from the header of each of the plurality of packets. The second node may then decode the coded data to obtain the control information.

In one design, the control information may be for all packets sent by the first node toward the second node. In another design, the control information may be for a data flow for the second node and may be sent in packets for the data flow.

In one design, the second node may continually detect for the control information. In another design, the second node may detect for a synchronization sequence in at least one packet. After the synchronization sequence has been detected, the second node may receive and process the plurality of packets to recover the control information.

FIG. 13 shows a design of an apparatus 1300 for receiving data in a communication network. Apparatus 1300 includes a module 1312 to receive a plurality of packets sent by a first node toward a second node, and a module 1314 to process the plurality of packets at the second node to obtain control information sent by the first node in a header of the plurality of packets.

The modules in FIGS. 11 and 13 may comprise processors, electronic devices, hardware devices, electronic components, logical circuits, memories, software codes, firmware codes, etc., or any combination thereof.

Figure 14:
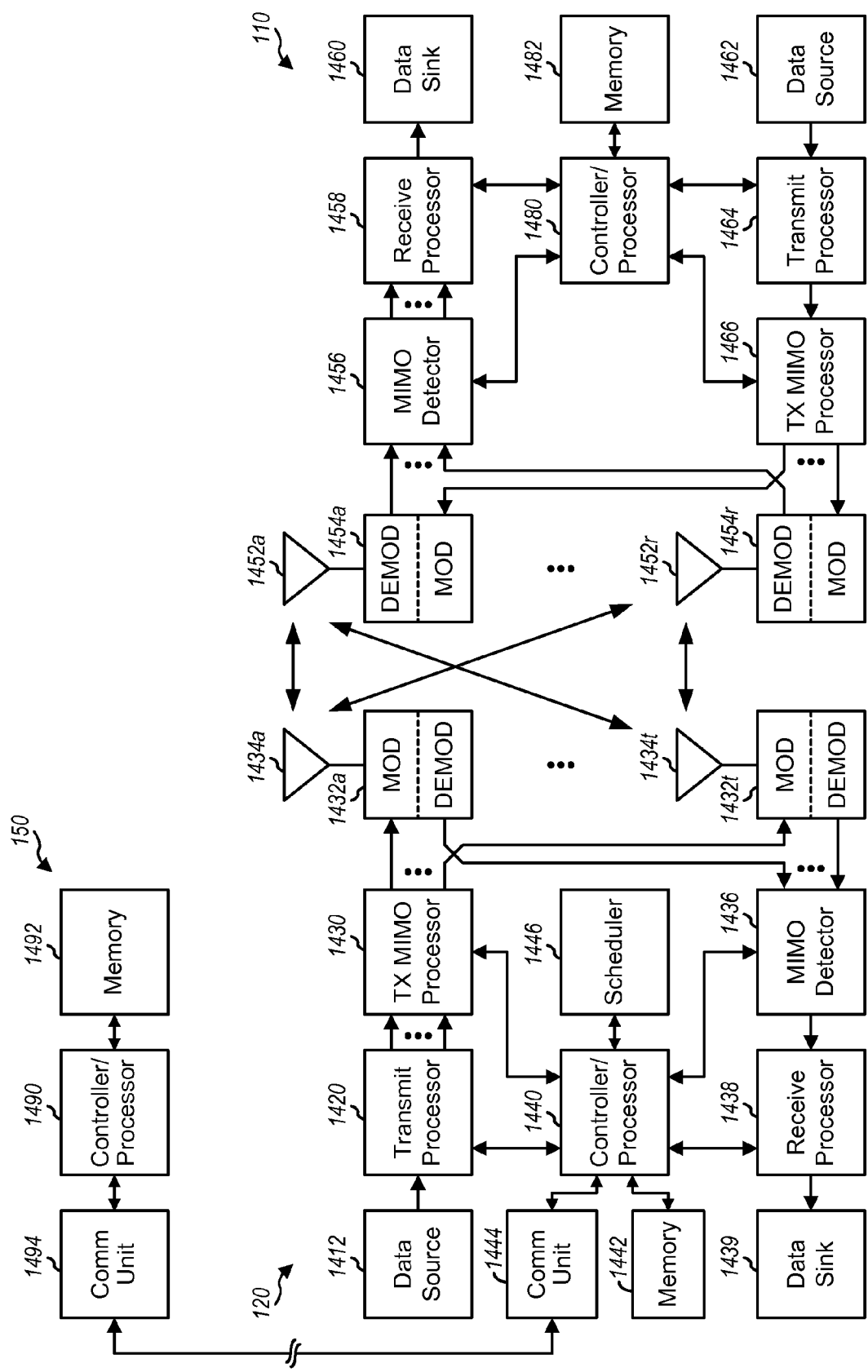
FIG. 14 shows a block diagram of a base station, a UE, and a network entity.

FIG. 14 shows a block diagram of a design of a base station 120 and a UE 110, which may be one of the base stations and one of the UEs in FIG. 1. Base station 120 may be equipped with T antennas 1434a through 1434t, and UE 110 may be equipped with R antennas 1452a through 1452r, where in general T≥1 and R≥1.

At base station 120, a transmit processor 1420 may receive data from a data source 1412 and control information (e.g., congestion information) from a controller/processor 1440.

Processor 1420 may process (e.g., encode and modulate) the data and control information to obtain data symbols and control symbols, respectively. Processor 1420 may also generate reference symbols for reference signals. A transmit (TX) multiple-input multiple-output (MIMO) processor 1430 may perform spatial processing (e.g., precoding) on the data symbols, the control symbols, and/or the reference symbols, if applicable, and may provide T output symbol streams to T modulators (MODs) 1432a through 1432t. Each modulator 1432 may process a respective output symbol stream (e.g., for OFDM, CDMA, etc.) to obtain an output sample stream. Each modulator 1432 may further process (e.g., convert to analog, amplify, filter, and upconvert) the output sample stream to obtain a downlink signal. T downlink signals from modulators 1432a through 1432t may be transmitted via T antennas 1434a through 1434t, respectively.

At UE 110, antennas 1452a through 1452r may receive the downlink signals from base station 120 and other base stations and may provide received signals to demodulators (DEMODs) 1454a through 1454r, respectively. Each demodulator 1454 may condition (e.g., filter, amplify, downconvert, and digitize) a respective received signal to obtain input samples. Each demodulator 1454 may further process the input samples (e.g., for OFDM, CDMA, etc.) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate and decode) the detected symbols, provide decoded data for UE 110 to a data sink 1460, and provide decoded control information to a controller/processor 1480.

On the uplink, at UE 110, a transmit processor 1464 may receive data from a data source 1462 and control information from controller/processor 1480. The control information may comprise messages for controlling the data rate of a transmitting node. Processor 1464 may process (e.g., encode and modulate) the data and control information to obtain data symbols and control symbols, respectively. Processor 1464 may also generate reference symbols. The symbols from transmit processor 1464 may be precoded by a TX MIMO processor 1466 if applicable, further processed by modulators 1454a through 1454r (e.g., for SC-FDM, OFDM, CDMA, etc.), and transmitted to base station 120 and possibly other base stations. At base station 120, the uplink signals from UE 110 and other UEs may be received by antennas 1434, processed by demodulators 1432, detected by a MIMO detector 1436 if applicable, and further processed by a receive processor 1438 to obtain decoded data and control information sent by UE 110 and other UEs. Processor 1438 may provide the decoded data to a data sink 1439 and the decoded control information to controller/processor 1440.

Controllers/processors 1440 and 1480 may direct the operation at base station 120 and UE 110, respectively. Processor 1440 and/or other processors and modules at base station 120 may perform or direct process 1000 in FIG. 10, process 1200 in FIG. 12, and/or other processes for the techniques described herein. Processor 1480 and/or other processors and modules at UE 110 may perform or direct process 1200 in FIG. 12 and/or other processes for the techniques described herein. Memories 1442 and 1482 may store data and program codes for base station 120 and UE 110, respectively. A communication (Comm) unit 1444 may enable base station 120 to communicate with other network entities. A scheduler 1446 may schedule UEs for data transmission on the downlink and/or uplink.

FIG. 14 also shows a design of a network entity 150, which may be an RNC, a router/gateway, or some other entity. Within network entity 150, a controller/processor 1490 may perform various functions to support communication, e.g., routing of data, detection of congestion, transmission of congestion information, etc. Controller/processor 1490 may perform process 1000 in FIG. 10, process 1200 in FIG. 12, and/or other processes for the techniques described herein. A memory 1492 may store program codes and data for network entity 150. A communication unit 1494 may enable network entity 150 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communication, comprising:
   determining control information to send from a first node to a second node;
   partitioning the control information into a plurality of parts; and
   sending the plurality of parts of the control information in headers of a plurality of packets toward the second node, wherein one part of the control information is sent in a header of each of the plurality of packets.

2. The method of claim 1, wherein the control information comprises congestion information indicative of traffic congestion at the first node.

3. The method of claim 2, wherein the congestion information comprises a maximum data rate supported by the first node.

4. The method of claim 2, wherein the determining the control information to send comprises
   receiving congestion information from a third node upstream to the first node,
   providing the received congestion information as the congestion information to send to the second node if a maximum data rate supported by the third node for the first node is less than or equal to a maximum data rate supported by the first node for the second node, and
   providing new congestion information as the congestion information to send to the second node if the maximum data rate supported by the first node for the second node is less than the maximum data rate supported by the third node for the first node.

5. The method of claim 2, wherein the sending the control information comprises sending the congestion information using Explicit Congestion Notification (ECN) bits in the headers of the plurality of packets for Internet Protocol (IP).

6. The method of claim 1, wherein the partitioning the control information comprises
   partitioning the control information, without encoding the control information, into the plurality of parts.

7. The method of claim 1, wherein the partitioning the control information comprises
   encoding the control information to obtain coded data, and
   partitioning the coded data into the plurality of parts.

8. The method of claim 7, wherein the encoding the control information comprises encoding the control information based on a block code, or a fountain code, or a convolutional code, or a Turbo code, or a combination thereof.

9. The method of claim 1, wherein the determining the control information comprises determining the control information for a data flow for the second node, and wherein the sending the control information comprises sending the control information in the headers of the plurality of packets for the data flow.

10. The method of claim 1, further comprising:
    sending a synchronization sequence in at least one packet prior to sending the control information in the plurality of packets.

11. The method of claim 1, wherein the first node comprises a network entity and the second node comprises a user equipment.

12. An apparatus for communication, comprising:
    means for determining control information to send from a first node to a second node;
    means for partitioning the control information into a plurality of parts; and
    means for sending the plurality of parts of the control information in headers of a plurality of packets toward the second node, wherein one part of the control information is sent in a header of each of the plurality of packets.

13. The apparatus of claim 12, wherein the control information comprises congestion information indicative of traffic congestion at the first node.

14. The apparatus of claim 12, wherein the means for partitioning the control information comprises
    means for partitioning the control information, without encoding the control information, into the plurality of parts.

15. The apparatus of claim 12, wherein the means for partitioning the control information comprises
    means for encoding the control information to obtain coded data, and
    means for partitioning the coded data into the plurality of parts.

16. The apparatus of claim 12, wherein the means for determining the control information comprises means for determining the control information for a data flow for the second node, and wherein the means for sending the control information comprises means for sending the control information in the headers of the plurality of packets for the data flow.

17. The apparatus of claim 12, further comprising:
    means for sending a synchronization sequence in at least one packet prior to sending the control information in the plurality of packets.

18. An apparatus for communication, comprising:
at least one processor configured to:
determine control information to send from a first node to a second node,
partition the control information into a plurality of parts, and
send the plurality of parts of the control information in headers of a plurality of packets toward the second node, wherein one part of the control information is sent in a header of each of the plurality of packets.

19. The apparatus of claim 18, wherein the control information comprises congestion information indicative of traffic congestion at the first node.

20. The apparatus of claim 18, wherein the at least one processor is configured to partition the control information, without encoding the control information, into the plurality of parts.

21. The apparatus of claim 18, wherein the at least one processor is configured to encode the control information to obtain coded data, and to partition the coded data into the plurality of parts.

22. The apparatus of claim 18, wherein the at least one processor is configured to determine the control information for a data flow for the second node, and to send the control information in the headers of the plurality of packets for the data flow.

23. The apparatus of claim 18, wherein the at least one processor is configured to send a synchronization sequence in at least one packet prior to sending the control information in the plurality of packets.

24. A computer program product, comprising:
a non-transitory computer-readable medium comprising:
code for causing at least one computer to determine control information to send from a first node to a second node,
code for causing the at least one computer to partition the control information into a plurality of parts, and
code for causing the at least one computer to send the plurality of parts of the control information in headers of a plurality of packets toward the second node, wherein one part of the control information is sent in a header of each of the plurality of packets.

25. A method for communication, comprising:
receiving a plurality of packets sent by a first node toward a second node; and
processing the plurality of packets at the second node to obtain control information sent by the first node in headers of the plurality of packets, wherein the control information is partitioned into a plurality of parts, and wherein one part of the control information is sent in a header of each of the plurality of packets.

26. The method of claim 25, wherein the control information comprises congestion information indicative of traffic congestion at the first node.

27. The method of claim 26, further comprising:
sending a message to reduce a data rate of a third node sending data to the second node in response to the congestion information.

28. The method of claim 25, wherein the control information is partitioned into the plurality of parts without encoding the control information.

29. The method of claim 25, wherein the control information is encoded and then partitioned into the plurality of parts, and wherein the processing the plurality of packets comprises
obtaining a portion of coded data from the header of each of the plurality of packets, and
decoding the coded data to obtain the control information.

30. The method of claim 25, wherein the control information is for a data flow for the second node and is sent in the plurality of packets for the data flow.

31. The method of claim 25, further comprising:
detecting a synchronization sequence in at least one packet, and wherein the plurality of packets are received and processed to recover the control information after the synchronization sequence is detected.

32. An apparatus for communication, comprising:
means for receiving a plurality of packets sent by a first node toward a second node; and
means for processing the plurality of packets at the second node to obtain control information sent by the first node in headers of the plurality of packets, wherein the control information is partitioned into a plurality of parts, and wherein one part of the control information is sent in a header of each of the plurality of packets.

33. The apparatus of claim 32, wherein the control information comprises congestion information indicative of traffic congestion at the first node.

34. The apparatus of claim 32, wherein the control information is partitioned into the plurality of parts without encoding the control information.

35. The apparatus of claim 32, wherein the control information is encoded and then partitioned into the plurality of parts, and wherein the means for processing the plurality of packets comprises
means for obtaining a portion of coded data from the header of each of the plurality of packets, and
means for decoding the coded data to obtain the control information.

36. The apparatus of claim 32, wherein the control information is for a data flow for the second node and is sent in the plurality of packets for the data flow.

37. The apparatus of claim 32, further comprising:
means for detecting a synchronization sequence in at least one packet, and wherein the plurality of packets are received and processed to recover the control information after the synchronization sequence is detected.

* * * * *